United States Patent
Bonner

(10) Patent No.: US 6,886,703 B1
(45) Date of Patent: May 3, 2005

(54) VERTICALLY EXTENDABLE WORK BUCKET APPARATUS

(76) Inventor: James D. Bonner, 2605 Wright Rd., Akron, OH (US) 44320

( * ) Notice: Subject to any disclaimer, the term of this patent is extended or adjusted under 35 U.S.C. 154(b) by 0 days.

(21) Appl. No.: 10/447,747

(22) Filed: May 30, 2003

Related U.S. Application Data

(63) Continuation-in-part of application No. 09/676,596, filed on Sep. 29, 2000, now Pat. No. 6,715,627.

(51) Int. Cl.[7] ............................................... B65D 6/28
(52) U.S. Cl. ...................... 220/4.03; 220/8; 220/23.87; 220/23.89
(58) Field of Search ............................ 220/4.27, 23.87, 220/23.98, 8, 4.03, 23.89; 206/506, 519, 206/520

(56) References Cited

U.S. PATENT DOCUMENTS

| | | | | |
|---|---|---|---|---|
| 3,454,151 A | * | 7/1969 | Plaskan | 220/8 |
| 3,762,539 A | * | 10/1973 | Kerr | 220/8 |
| 4,234,093 A | * | 11/1980 | Tyson | 220/8 |
| 4,529,092 A | * | 7/1985 | Swingley, Jr. | 206/593 |
| 4,784,112 A | * | 11/1988 | Hayashi | 220/8 |
| 5,078,287 A | * | 1/1992 | Holmes, III | 220/8 |
| 5,671,856 A | * | 9/1997 | Lisch | 220/4.27 |
| 6,715,627 B1 | * | 4/2004 | Bonner et al. | 220/4.27 |

* cited by examiner

*Primary Examiner*—Joseph Man-Fu Moy
(74) *Attorney, Agent, or Firm*—John D. Gugliotta; Olen L. York, III

(57) ABSTRACT

A vertically adjustable work bucket apparatus includes a shell and a container, wherein the container is vertically adjustable within the shell. The shell includes a plurality of furrow series, wherein the furrows series each have a plurality of furrows, along the interior sidewall of the shell. The furrows are provided to receive, house and support corresponding ribs that are affixed to the exterior sidewall of the container. The container is radially rotated so that the ribs are aligned within the furrows to match a desired profile setting, including at least a maximum and minimum profile. The shell includes a plurality of rollers affixed to the bottom of the shell to allow for easy transportation and positioning of the apparatus.

20 Claims, 7 Drawing Sheets

US 6,886,703 B1

VERTICALLY EXTENDABLE WORK BUCKET APPARATUS

RELATED APPLICATIONS

The present application is a Continuation-In-Part of U.S. patent application Ser. No. 09/676,596, filed on Sep. 29, 2000 now U.S. Pat. No. 6,715,627, claiming the benefit of priority therefrom.

BACKGROUND OF THE INVENTION

1. Field of the Invention

The present invention relates generally to a work bucket and, more particularly, to such a vertically extendable work bucket apparatus.

2. Description of the Related Art

There are a great deal of cleaning tasks that are performed with a bucket of water, detergent or other cleaning liquid. These tasks range from the cleaning of small spills, to window washing, to the washing of automobiles and large trucks. A common trait with all of these cleaning tasks is the requirement of the user to bend over to reach the bucket while rinsing sponges, rags and the like. This repeated bending over places strains on the user's back muscles. Also, when the bucket requires moving such as when moving to the next window or the other side of the car, the user is forced to lift the bucket and carry it. This action once again places stress and strain on not only the user's back muscles but their leg and arm muscles as well.

A search of the prior art did not disclose any patents that read directly on the claims of the instant invention; however, the following references were considered related.

The following patents disclose a multi-purpose fishing bucket with a nesting member.

- U.S. Pat. No. 5,970,651, issued in the name of Torkilsen et al.;
- U.S. Pat. No. 5,319,877, issued in the name of Hagan; and
- U.S. Pat. No. 4,759,148, issued in the name of Love
- U.S. Pat. No. 5,573,367, issued in the name of Erickson et al., describes a nestable container for hauling materials.
- U.S. Pat. No. 5,456,357, issued in the name of Wenner et al., discloses a nestable bucket and caddy; and
- U.S. Pat. No. 5,199,571, issued in the name of Wolff et al., describes a nestable bucket having lockable bails; and
- U.S. Pat. No. 4,040,460, issued in the name of Thornton, discloses a collapsible bucket with telescopic erecting members; and
- U.S. Pat. No. D 355,735, issued in the name of Shaffer et al., describes the ornamental design for a combined bucket with nested containers and lid therefor.

Consequently, there exists a continuous need for new product ideas and enhancements for work bucket related products.

SUMMARY OF THE INVENTION

It is therefore an object of the present invention to provide a vertically adjustable work bucket apparatus.

It is a further object of the present invention to provide an apparatus having an external shell housing a container, thereby providing potentially two means of storage.

It is a further object of the present invention to provide an apparatus that includes a plurality of furrows and furrow series to permit the vertical adjustment of the container within the shell.

It is a further object of the present invention to provide an apparatus that includes a plurality of ribs along the exterior sidewall of the container, wherein the ribs are inserted into and supported by the furrows, thereby setting the vertical profile of the container within the shell.

Briefly described according to one embodiment of the present invention, a vertically adjustable work bucket apparatus includes a shell and a container, wherein the container is vertically adjustable within the shell. The shell includes a plurality of furrows and furrow series along the interior sidewall of the shell. The furrows are provided to receive, house and support corresponding ribs that are affixed to the exterior sidewall of the container. The container is radially rotated so that the ribs are aligned within the furrows to match a desired profile setting, including at least a maximum and minimum profile. The shell includes a plurality of rollers affixed to the bottom of the shell to allow for easy transportation and positioning of the apparatus.

A feature of the present invention includes the use of durable materials, including metal, plastics or treated wood, that is manufactured in a cost efficient manner and is capable of withstanding repeated usage and providing a long useful life to the apparatus.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the FIGS. 1–8.

1. Detailed Description of the Figures

Figure 1:
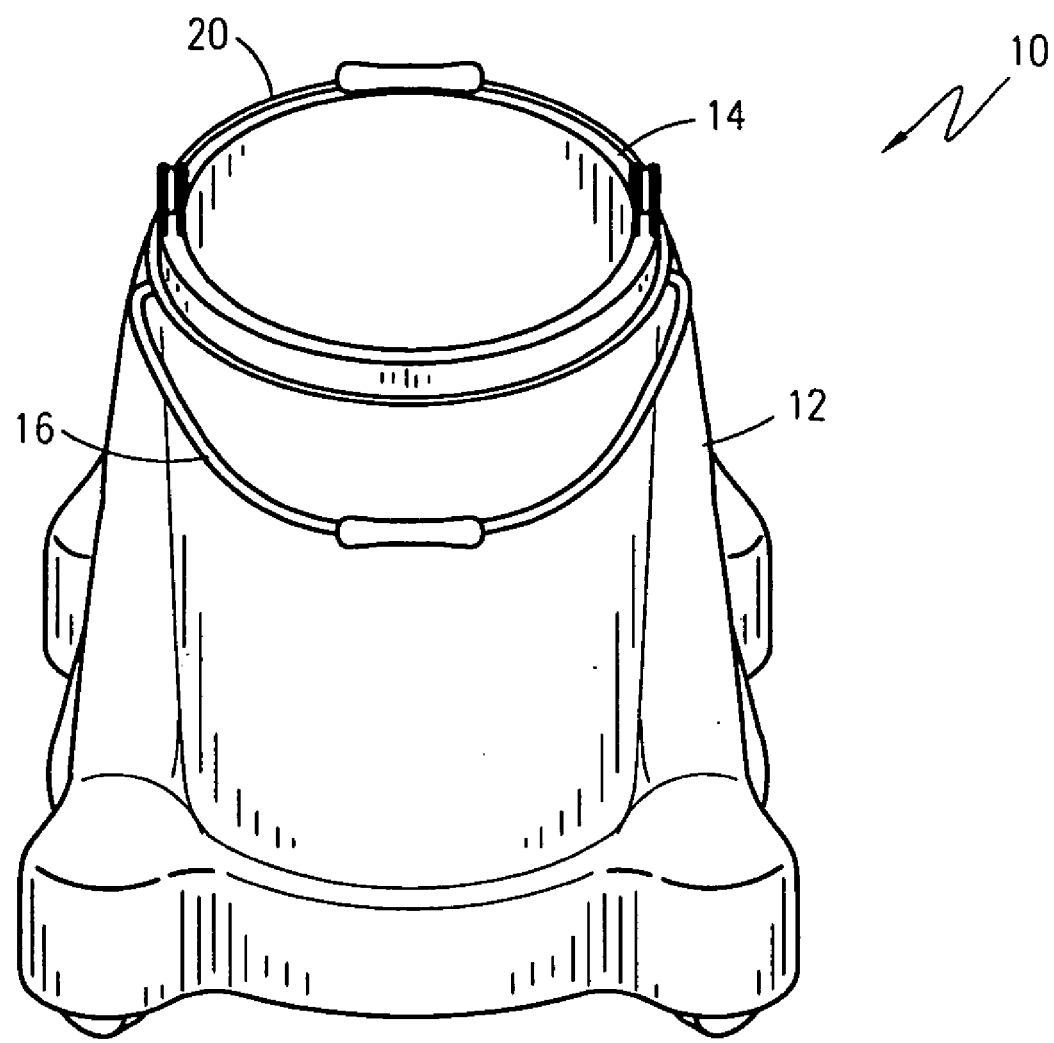
FIG. 1 is a perspective view of the vertically extendable work bucket apparatus, wherein the container is resting within the shell at a minimum profile.
Figure 2:
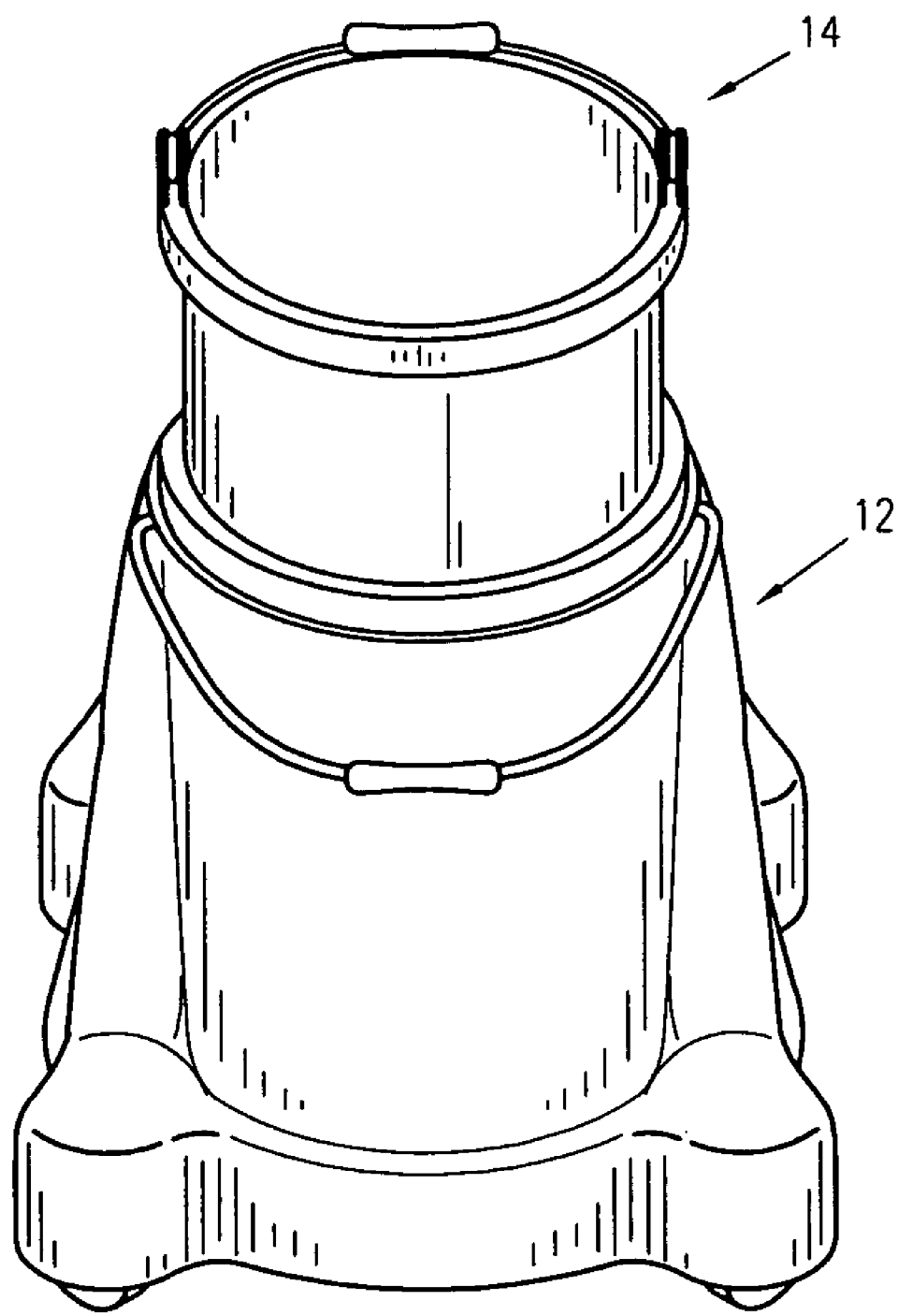
FIG. 2 is a perspective view of the vertically extendable work bucket apparatus, wherein the container is vertically adjusted within the shell to a maximum profile.
Figure 3:
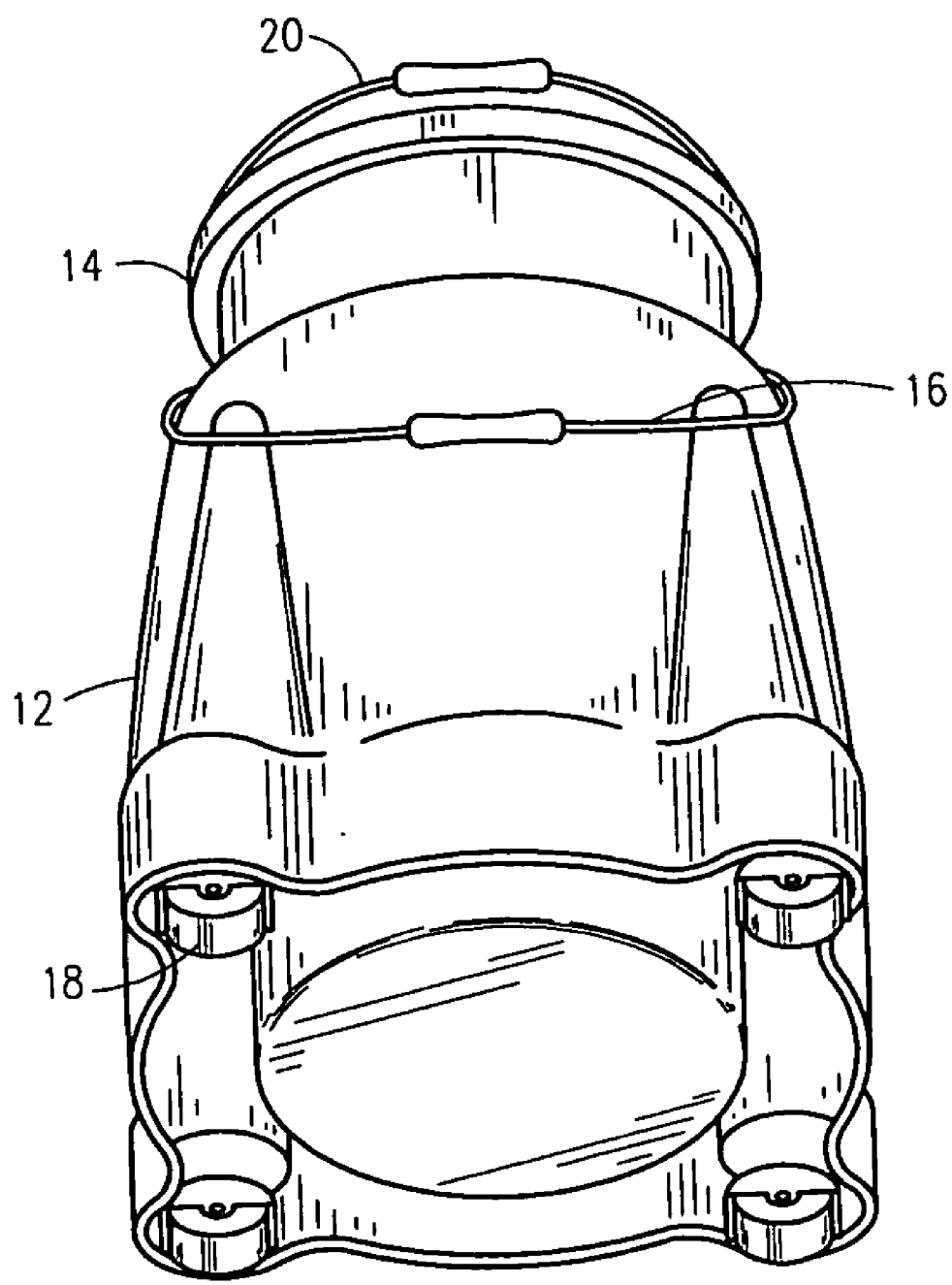
FIG. 3 is a perspective view of the vertically extendable work bucket apparatus, wherein the bottom of the shell is viewed and illustrating the plurality of rollers provided for maneuvering and positioning the apparatus.

Referring now to FIG. 1 through FIG. 3, a vertically extendable work bucket apparatus 10 is shown in accordance with a preferred embodiment of the present invention. The apparatus 10 comprises a shell 12 and a container 14 housed therein. The shell 12 and container 14 may be of the same general geometric configuration, such as the tubular forms depicted in FIG. 1 through FIG. 5, although it is envisioned other forms (such as triangulated or orthogonal configurations) may be provided. The shell 12 comprises a handle 16 and a plurality of rollers (wheels, casters) 18 affixed to the bottom of the shell 12, provided to allow the apparatus 10 to roll in a variety of directions. The container 14 comprises a separate handle 20.

Figure 4:
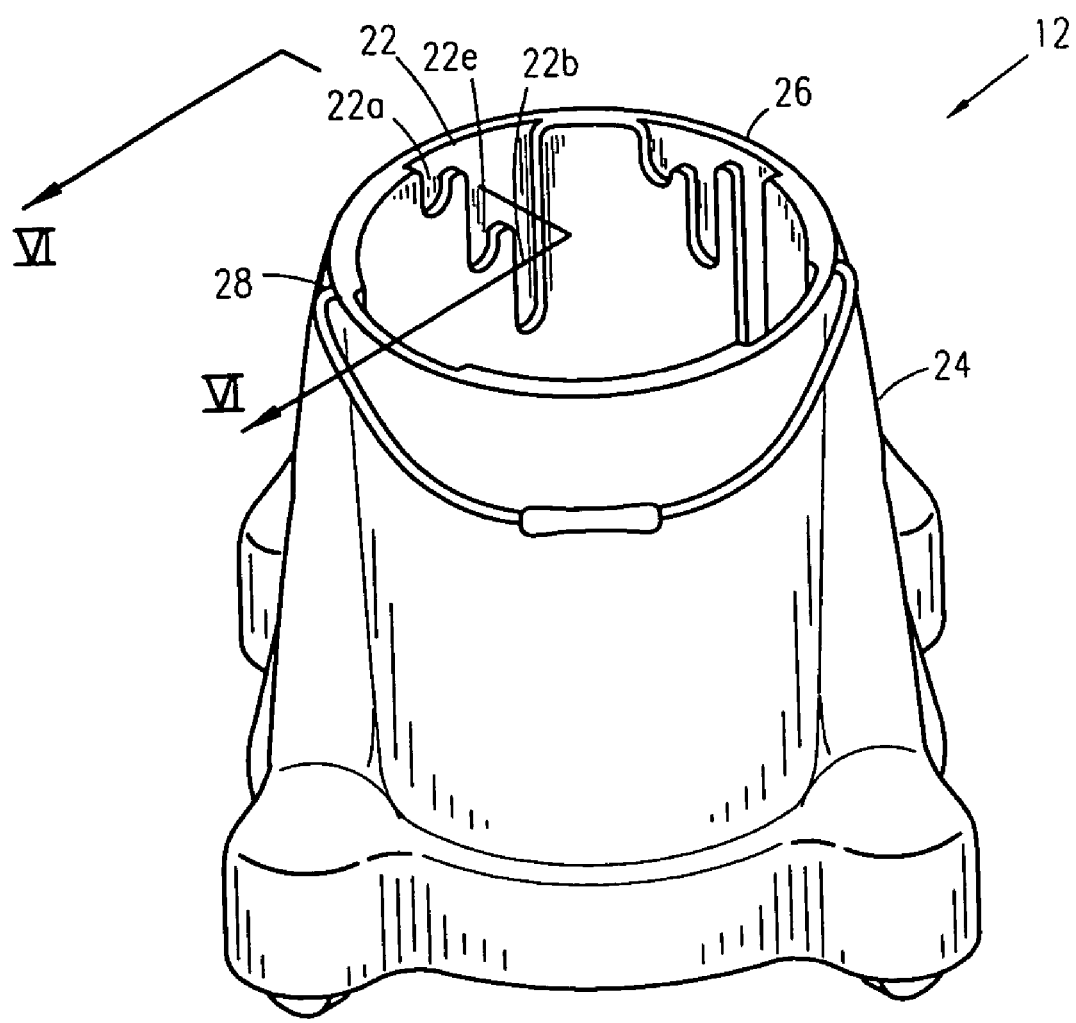
FIG. 4 is a perspective view the shell, wherein a furrow series is shown along the internal circumference of the lumen formed in the shell.

Referring specifically to FIG. 4, the container 14 is removed from the shell 12 to expose the furrows 22 formed along the interior wall of the shell 12 and within the lumen 38 (the lumen 38 formed from a cylindrical sidewall and base of shell 12). The furrows 22 are grouped as a series that permit vertical adjustment of the profile of the container 14. As depicted in FIG. 4, the furrows 22 are grouped as a series of three furrows (hereinafter "furrow series 22"), although the grouping of three furrows is only an example of several embodiments envisioned, wherein the furrow series 22 may include as few as two furrows and up to a five or six furrows, or more if desired, depending upon the flexibility desired by the user in vertically adjusting the container 14. The furrow series 22 comprises at least a maximum profile furrow 22a and a minimum profile furrow 22b. In the embodiment depicted in FIG. 4, an intermediate profile furrow 22c is provided to permit vertical adjustment to a position intermediate to the maximum and minimum profiles provided by furrows 22a and 22b, respectively. It is envisioned that a plurality of intermediate profile furrows (not shown) may also be provided in a furrow series 22 having more than three furrows. The individual furrows 22 (referred to generically to encompass the particular furrow series 22a, 22b and 22c as provided, regardless of the actual number of furrows) are provided to receive a rib 40 that is affixed to the container 14 (further described below). It is envisioned that one embodiment of the present invention includes at least two furrow series (identified as 22 and 24), wherein the two furrow series 22 and 24 are aligned opposite (approximately 180° opposite) to one another within the internal circumference or perimeter of the shell 12. It is also envisioned that four furrow series 22 are provided (identified as 22, 24, 26 and 28), wherein each of the four furrow series 22, 24, 26 and 28 are positioned approximately 90° to the preceding series 22, 24, 26 or 28. Other similar configurations are envisioned, provided that the cost effectiveness of the apparatus 10 is not compromised and the complexity or difficulty in operating the apparatus 10 is not increased. A plurality of rollers 18 are provided along the bottom of the shell 12, either permanently or removably affixed, and provided to allow for maneuvering the apparatus 10 from one position to another desired position. Each roller 18 may include locking means for impinging the movement of each roller 18, thereby preventing the rollers 18 from unnecessarily moving the apparatus 10. Opposing furrow series 22 and 24 (for example) are not mirror images of one another. Instead, opposing furrow series 22 and 24 (for example) and the individual furrows ascend and/or descend so that the minimum profile furrow 22b of one series is approximately 180° opposite to the minimum profile furrow 22b of the opposing furrow series.

Figure 5:
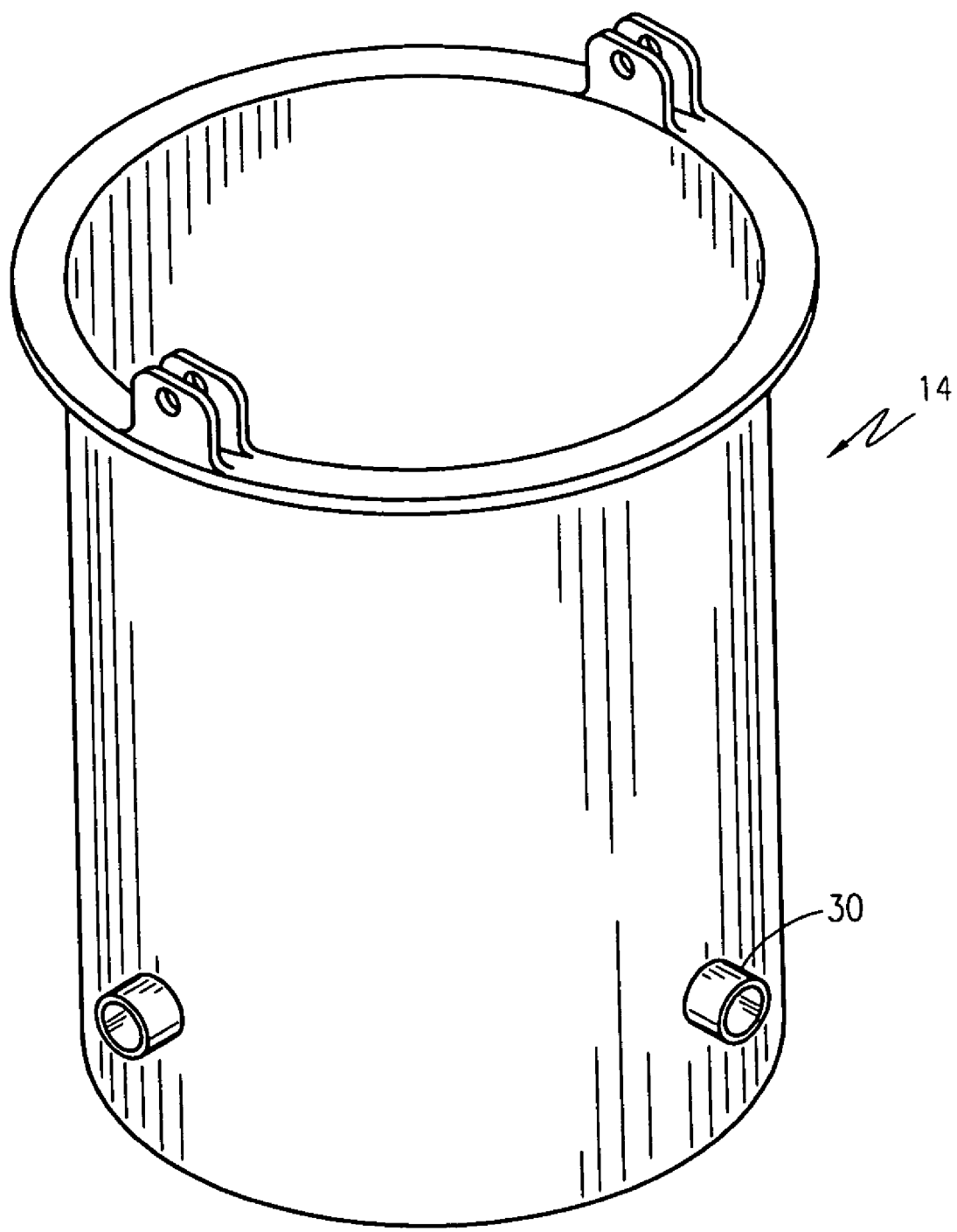
FIG. 5 is a perspective view of the container, illustrating the annular lip at the top of the container and the ribs provided substantially adjacent to the junction of the base and the sidewall of the container.

Referring specifically to FIG. 5, the container 14 comprises a cylindrical sidewall 30 (although other geometric configurations are also envisioned, such as triangulated or orthogonal forms), a solid base 32 at the base of the sidewall 30, and an opening 34 in the top of the sidewall 30 (opposite to the base 32) with an annular lip 36 circumscribing the top of the sidewall 30. The container 14 is dimensioned so as to slidably insert within the lumen 38 of the shell 12 and so that the annular lip 36 abuts the top of the shell 12. A plurality of ribs 40 are positioned substantially adjacent to the junction of the base 32 and the sidewall 30 along the exterior portion of the container 14. The number of ribs 40 correspond to the number of furrow series 22 that are provided, thus if four furrow series 22, 24, 26 and 28 are provided, four ribs 40 will be provided to physically and mechanically communicate with the furrow series 22, 24, 26 and 28.

Figure 6:
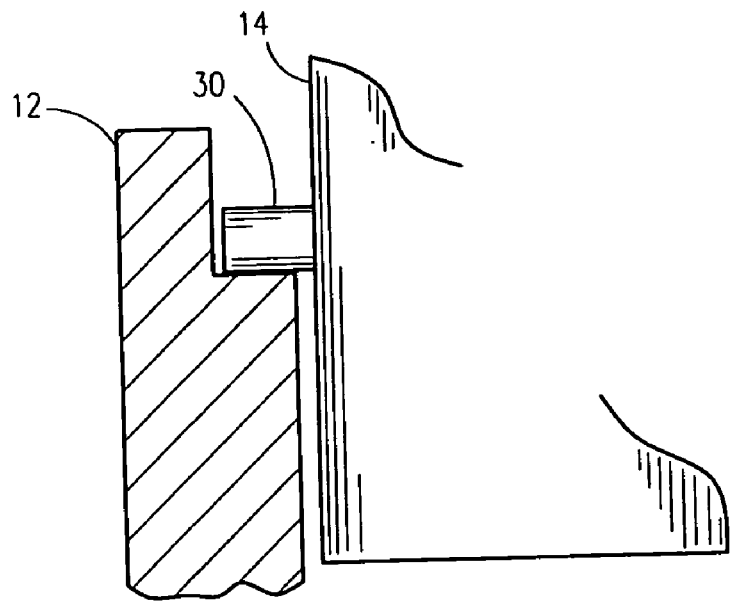
FIG. 6 is a cross-sectional view of a furrow within a furrow series housing and supporting a rib, wherein the view is taken along the line VI—VI of FIG. 4.
Figure 7:
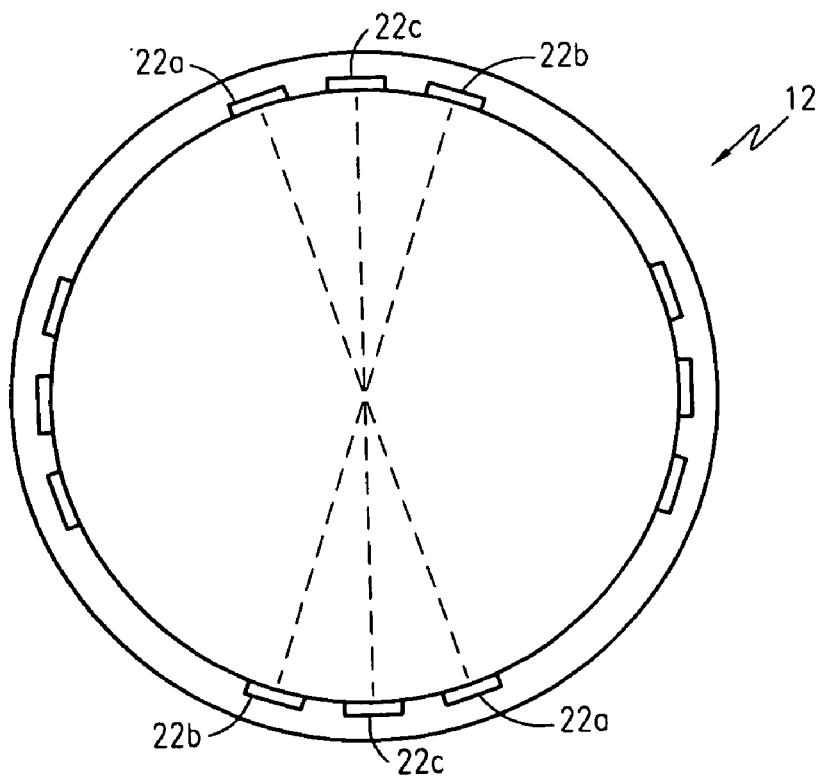
FIG. 7 is a top view of the shell to illustrate the alignment of the individual furrows within a particular furrow series in comparison to the furrow series opposite, wherein maximum, intermediate and minimum profile furrows are approximately 180° opposite one another.

Referring specifically to FIG. 6, a sectional view of one of the ribs 40 inserted into a furrow 22a, 22b or 22c (or other additional furrows provided). The base of the furrow 22a, 22b or 22c includes a horizontal ledge 42 on which the rib 40 abuts against and is supported by. FIG. 6, and the explanation thereof, serves as a representative model of each rib 40 as it is inserted into a particular furrow 22a, 22b or 22c. FIG. 7 illustrates a top view of the shell 12 and the furrows 22a, 22b and 22c and the approximate 180° alignment of the respective maximum, intermediate and minimum profile furrows formed along the interior walls of the shell 12.

The shell 12 and container 14, respectively, are envisioned to be manufactured from materials that are durable and capable of withstanding repeated usage. Such materials include metal, plastic and treated wood or wood-like materials. It is envisioned that the shell 12 and container 14 may operate independently of one another, wherein the container 14 may be extracted from the shell 12 and the shell 12 and container 14 filled with liquids or solids as required. The container 14, having a substantially flat base 32, is capable of resting on a flat or substantially flat surface when extracted from the shell 12.

2. Operation of the Preferred Embodiment

Figure 8:
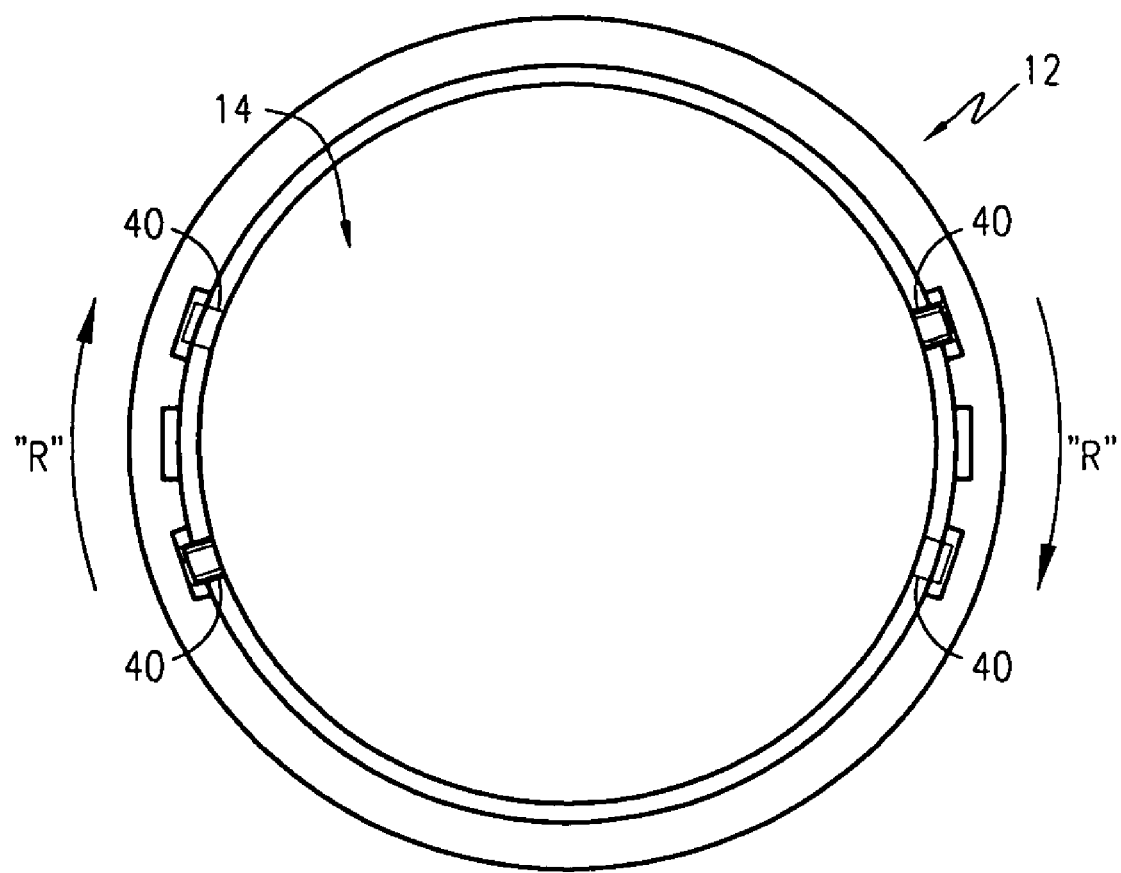
FIG. 8 is a top view of the shell and container so as to illustrate the radial rotation (along directional arrows "R") necessary to vertically adjust the container.

As assembled, a user will use the apparatus 10 in a manner similar to the accustomed use of a work bucket. A user will place the desired material within the container 14, and using the provided rollers 18, the user may transport the apparatus 10 to another location without having to strain or lift the apparatus 10. To adjust the vertical profile of the apparatus 10, a user (either before or after filling the container 14) will grasp the annular lip 36, raise the container 14 and then radially rotate (indicated as directional arrows "R" in FIG. 8) the container 14 in the desired direction to insert a rib 40 into a corresponding furrow 22a, 22b or 22c (or additional furrows if provided), wherein the radial rotation of the container 14 is dependent upon the resting position of the container 14 and the vertical adjustment that is required for the user's needs. As illustrated in FIG. 8, the ribs 40 are initially aligned approximately 180° in opposing furrows 22 (shown as a darkened rib 40) and is then radially rotated about directional arrows "R" until the ribs 40 are aligned in different furrows 22 (ribs 40 shown in phantom lines to indicate different alignment than original alignment).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. Therefore, the scope of the invention is to be limited only by the following claims.

What is claimed is:

1. A vertically extendable work bucket apparatus comprising:
   a shell having a generally cylindrical sidewall and a base and forming an internal lumen;
   a vertically adjustable container having a generally cylindrical sidewall and a base and forming a storage volume, said container having a plurality of ribs along an exterior of said container for permitting vertical adjustment of said container within said shell; and
   at least two furrow series formed along an interior wall of said lumen for receiving said plurality of ribs to facilitate vertical adjustment of said container.

2. The vertically extendable work bucket apparatus of claim 1, wherein said shell comprises a pivoting handle affixed to a top portion thereof.

3. The vertically extendable work bucket apparatus of claim 1, wherein said shell comprises a plurality of rollers affixed to said shell base.

4. The vertically extendable work bucket apparatus of claim 3, wherein each of said plurality of rollers comprise roller locking means to prevent unnecessary movement of said apparatus.

5. The vertically extendable work bucket apparatus of claim 1, wherein said container further comprises an annular lip circumscribing a top of said sidewall of said container, said lip abutting a top of said sidewall of said shell at a lowest profile.

6. The vertically extendable work bucket apparatus of claim 1, wherein said container further comprises a pivoting handle affixed to a top portion thereof.

7. The vertically extendable work bucket apparatus of claim 1, wherein said at least two furrow series are aligned approximately 180° apart.

8. The vertically extendable work bucket apparatus of claim 1, wherein each one of said at least two furrow series comprises:
   a maximum profile furrow; and
   a minimum profile furrow.

9. The vertically extendable work bucket apparatus of claim 8, wherein each one of said at least two furrow series comprises an intermediate profile furrow to permit vertical adjustment to a position intermediate to said maximum profile furrow and said minimum profile furrow.

10. The vertically extendable work bucket apparatus of claim 9, wherein each one of said maximum profile furrow, said intermediate profile furrow and said minimum profile furrow comprise a horizontal ledge on which one of said plurality of ribs is suspendedly supported.

11. The vertically extendable work bucket apparatus of claim 1, wherein said apparatus further comprises a third furrow series formed along said interior wall of said lumen intermediate to said at least two furrow series.

12. The vertically extendable work bucket apparatus of claim 11, wherein said at least two furrow series are aligned approximately 180° apart, said third furrow series aligned approximately 90° from each of said at least two furrow series.

13. The vertically extendable work bucket apparatus of claim 12, wherein each one of said at least two furrow series and said third furrow series comprises:
   a maximum profile furrow; and
   a minimum profile furrow.

14. The vertically extendable work bucket apparatus of claim 13 wherein each one of said at least two furrow series and said third furrow series comprises an intermediate profile furrow to permit vertical adjustment to a position intermediate to said maximum profile furrow and said minimum profile furrow.

15. The vertically extendable work bucket apparatus of claim 14, wherein each one of said maximum profile furrow, said intermediate profile furrow and said minimum profile furrow comprise a horizontal ledge on which one of said plurality of ribs is suspendedly supported.

16. The vertically extendable work bucket apparatus of claim 1, wherein said apparatus further comprises:
   a third furrow series formed along said interior wall of said lumen intermediate to said at least two furrow series; and
   a fourth furrow series formed along said interior wall of said lumen intermediate to said at least two furrow series, said fourth furrow series aligned approximately 180° apart from said third furrow series.

17. The vertically extendable work bucket apparatus of claim 16, wherein each one of said at least two furrow series, said third furrow series and said fourth furrow series comprises:
   a maximum profile furrow; and
   a minimum profile furrow.

18. The vertically extendable work bucket apparatus of claim 17, wherein each one of said at least two furrow series, said third furrow series and said fourth furrow series an intermediate profile furrow to permit vertical adjustment to a position intermediate to said maximum profile furrow and said minimum profile furrow.

19. The vertically extendable work bucket apparatus of claim 18, wherein each one of said maximum profile furrow, said intermediate profile furrow and said minimum profile furrow comprise a horizontal ledge on which one of said plurality of ribs is suspendedly supported.

20. The vertically extendable work bucket apparatus of claim 1, wherein said container is vertically adjusted by radial rotation of said container so as to adjust alignment of said plurality of ribs in relation to said at least two furrow series.

* * * * *